(12) United States Patent
Friedlaender

(10) Patent No.: US 8,314,207 B2
(45) Date of Patent: Nov. 20, 2012

(54) METHOD AND DEVICE FOR PURIFYING THERMOPLASTIC POLYMERS

(75) Inventor: Thomas Friedlaender, Regensburg (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 13/281,843

(22) Filed: Oct. 26, 2011

(65) Prior Publication Data

US 2012/0101220 A1 Apr. 26, 2012

(30) Foreign Application Priority Data

Oct. 26, 2010 (DE) .......................... 10 2010 042 959

(51) Int. Cl.
*C08G 64/00* (2006.01)
*C08G 63/02* (2006.01)

(52) U.S. Cl. ......... 528/502; 424/422; 424/426; 424/486

(58) Field of Classification Search .................. 424/422, 424/426, 486; 528/502
See application file for complete search history.

(56) References Cited

U.S. PATENT DOCUMENTS

| 2006/0157879 A1 | 7/2006 | Gneuss |
| 2010/0249253 A1 | 9/2010 | Fernandez Acevedo et al. |

FOREIGN PATENT DOCUMENTS

| DE | 4018310 C1 | 5/1991 |
| DE | 41 12786 A1 | 10/1992 |
| DE | 4137298 A1 | 5/1993 |
| JP | 9039073 A | 2/1997 |
| JP | 2007246833 A | 9/2007 |
| WO | WO-9308975 A1 | 5/1993 |

OTHER PUBLICATIONS

Search Report for DE 10 2010 042 959.7, dated Jan. 26, 2011.
European Search Report for 11176464, dated Feb. 21, 2012.

*Primary Examiner* — Terressa Boykin
(74) *Attorney, Agent, or Firm* — Marshall, Gerstein & Borun LLP

(57) ABSTRACT

A method of purifying a thermoplastic polymer having at least one dispersed filler, including preparing a polymer melt of the thermoplastic polymer, and filtering the polymer melt, where the dispersed filler is at least partially transformed to a coagulated and filterable form before the filtering step. Also, a device for purifying the thermoplastic polymer, including means for preparing a polymer melt from the thermoplastic polymer, and filter means, and means for generating sound waves, preferably ultrasonic waves.

34 Claims, 1 Drawing Sheet

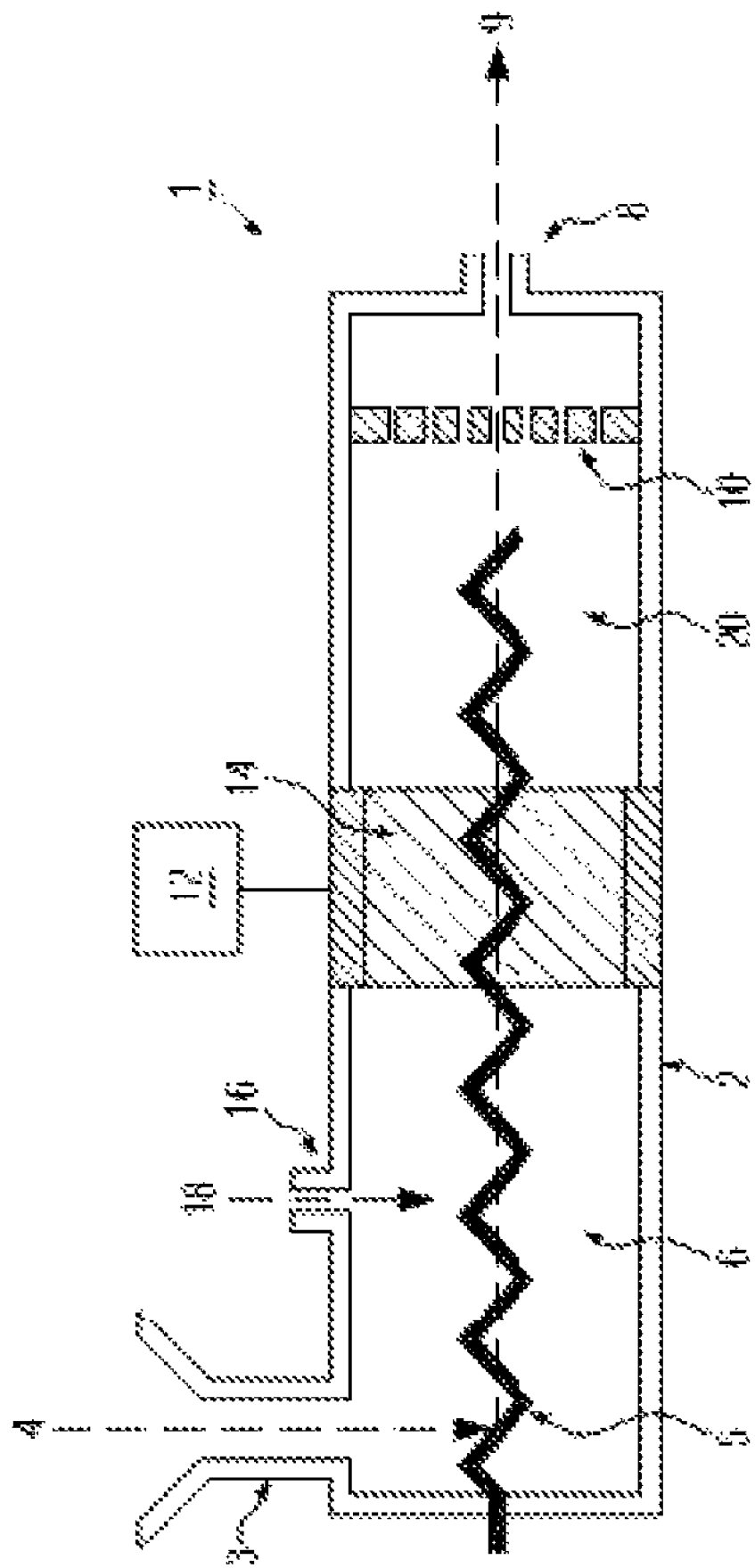

METHOD AND DEVICE FOR PURIFYING THERMOPLASTIC POLYMERS

CROSS-REFERENCE TO RELATED APPLICATION

The present application claims the benefit of priority of German Application No. 102010042959.7, filed Oct. 26, 2010. The entire text of the priority application is incorporated herein by reference in its entirety.

FIELD OF THE DISCLOSURE

The disclosure relates to a method and to a device for purifying a thermoplastic polymer, and the use of a coagulant and/or an agent for generating sound waves for purifying the thermoplastic polymer.

BACKGROUND

Thermoplastic polymers can be used for diverse applications, for example in the packaging industry. Here, the polymers are often mixed with fillers to improve very diverse material properties. For example, titanium oxide pigments are employed in particular in PET beverage bottles to achieve imperviousness to visible light, thus increasing the durability of light-sensitive food, such as milk. Furthermore, coloring pigments are often used to modify the optical appearance of the bottles. Additives are also often added to influence gas diffusion. The fillers are dispersed in the polymer matrix as finely and regularly as possible to achieve an optically homogenous mixture and not to deteriorate the mechanical material properties. This is conventionally done by master batch technologies and/or the use of surface-modified fillers.

The good dispersion of the fillers in the thermoplastic polymers, however, leads to problems in conventional recycling processes of these materials as the fillers can be only insufficiently removed from the recyclate.

For recycling, the materials are usually collected after they have been used, sorted according to the material types by mechanical and physical separation methods, then cut into smaller pieces, the so-called polymer flakes, and washed. These polymer flakes represent an intermediate in the recycling process and are transformed again to polymer granules by a continuous extrusion procedure which can be reshaped again to any arbitrary products.

The remaining coloring pigments in the recyclate deteriorate its quality and recyclability as only products can be manufactured from it which have a darker hue than the recyclate. On the other hand, it is required for many applications to obtain a colorless, transparent product. To suppress this negative effect, a mechanical filter is usually provided in the extrusion and granulation device by means of which fillers are to be separated from the polymer melt. However, the particle sizes of finely dispersed fillers can already be within the range of the polymer macromolecules, so that they can not or only insufficiently be removed from the polymer melt by the mechanical filtering step.

DE 4112786 A1 and JP 2007/246833A describe methods of separating fillers from polymer solutions, however without disclosing the separation from a polymer melt. US 2010/0249253 A1 relates to a method for recycling polyvinyl butyral in laminated glass, comprising chemical purifying steps, where the polyvinyl butyral is present in the solid phase. These methods are relatively complicated and ineffective as they require the preparation of a polymer solution or chemical treatment.

SUMMARY OF THE DISCLOSURE

Thus, one aspect of the disclosure is to provide a method and a device for purifying thermoplastic polymers, where fillers dispersed in the polymer can be effectively and inexpensively separated off, and where purifying can be performed with a mechanical filter.

In the disclosed method, before the step of filtering the polymer melt, the dispersed filler is at least partially transformed to a coagulated and filterable form. By the coagulation of the fillers to agglomerates, the volume is enlarged (that means the mean particle diameter is enlarged). By this, the particle size of the coagulated fillers can be increased, as compared to the size of the polymer macromolecules, to such an extent that these can be effectively removed from the polymer melt by a mechanical filtering step. Thus, mechanical filter systems for separating off the fillers from the thermoplastic polymers can be used. By the increase of the particle size of the fillers before the filtering process, it is furthermore permitted to use filters with relatively large filter pores. By this, the method for purifying the thermoplastic polymers is effective and inexpensive as by the increase of the filter pore size, the flow of the polymer melt through the filter is facilitated and accelerated.

Preferably, the transformation of the dispersed filler to a coagulated and filterable form is accomplished by adding a coagulant. The addition of this coagulant to the thermoplastic polymer can be effected already before the preparation of the polymer melt, i.e. at a point in time when the thermoplastic polymer is present in a solid state. In addition or as an alternative, the coagulant can be added at a point in time when the thermoplastic polymer is already present in the melt. By adding the coagulant, the dispersed filler can be particularly effectively coagulated and transformed to a filterable form. Furthermore, by this a particularly large coagulate particle diameter can be achieved and thus the required filter pore size can be further increased.

In particular, coagulation of the dispersed filler is effected due to a chemical reaction of the filler with the coagulant. In addition or as an alternative, a chemical reaction of the filler itself can be effected which is induced by the coagulant, and/or it is possible that the coagulation of the dispersed filler is effected due to the change of at least one physical parameter, in particular the pH value, this change being induced by the coagulant. By this, a particularly effective coagulation of the dispersed filler and thus an effective purification of the thermoplastic polymer are possible.

As an alternative to or in combination with this, the transformation of the dispersed filler to a coagulated and filterable form can be effected by treating the polymer melt with sound waves. In particular, ultrasonic waves are used for this, preferably between 60 kHz and 1.6 GHz, particularly preferred between 20 kHz and 100 kHz. By the treatment with sound waves, coagulation is particularly effective and quick. In particular in connection with the use of coagulants, the additional introduction of sound waves can support and accelerate the coagulation process of the fillers induced by the coagulant.

The present disclosure in particular comprises thermoplastic polymers which are selected from the group comprising polyester, polystyrene, polyolefin, polyamide and polycarbonate, preferably polyethylene terephthalate, polypropylene or polyethylene, or copolymers of these polymers.

All foreign matters present in the polymer are referred to as fillers. Included are in particular organic and/or inorganic fillers which are selected from the group comprising colorants, such as pigments, in particular titanium dioxide, light stabilizers, reinforcing agents, in particular fibers, such as glass fibers or polymer fibers, flame retardants, oxygen scavengers or anti-blocking agents. Furthermore, catalysts that have been used in the manufacture of the polymers are included, such as e.g. antimony catalysts for the manufacture of polyesters, such as PET. The quantitative separation of these fillers from the thermoplastic polymer in recycling increases the quality and reprocessability of the recyclate.

Depending on the type of fillers, these are present in the polymeric matrix in particular in a molecular dispersed form or in the form of particles. Here, the molecule diameter or the mean particle diameter is in particular below 1 μm, preferably below 0.1 μm, particularly preferred below 0.05 μm. By this, good dispersion of the fillers is ensured, so that the desired material properties in the product can be achieved.

After coagulation, the coagulated fillers are present in the polymer melt in the form of particles, where the mean particle size is in particular more than 5 μm, preferably more than 10 μm, particularly preferred more than 100 μm. By this, the coagulated fillers can be quickly and effectively separated off from the polymer melt by mechanical filters.

It is furthermore preferred that the mean particle diameter of the fillers is increased by the coagulation at least by a factor 5, preferably factor 10, particularly preferred factor 100. By such a design, it is possible to achieve particularly effective purification of the thermoplastic polymers by the filtering step as the size of the coagulated particles or the ratio of the dispersed fillers to the coagulated fillers can be adjusted such that a particularly effective separation or method procedure can be effected.

The disclosed device comprises means for generating sound waves, in particular ultrasonic waves. By this, sound waves are applied to the polymer melt in the device, inducing an effective and quick coagulation of the fillers dispersed in the polymer melt. By the transformation to a coagulated form, the fillers can be separated off from the polymer by mechanical filter systems. It is furthermore permitted to use filters with relatively large filter pores. By this, the purification of the thermoplastic polymers in the device is effective and inexpensive as by the increase of the filter pore size, the flow of the polymer melt through the filter is facilitated and accelerated.

In particular, the means for preparing the polymer melt in the device is a screw-type kneading and extruding device for continuously generating and transporting a polymer melt, where the means for generating sound waves is arranged such that sound waves are applied to the polymer melt within the screw-type kneading and extruding device, and that it is arranged with respect to the filter means such that it is located upstream with respect to the direction of transport of the polymer melt. By such an embodiment of the device, an effective application of sound waves to the polymer melt is possible, permitting a quick and effective coagulation of the dispersed fillers.

In particular, the means for generating sound waves is an ultrasonic wave apparatus with a frequency between 16 kHz and 1.6 GHz, particularly preferred between 20 kHz and 100 kHz. By the application of sound waves of such a frequency, dispersed fillers can be particularly quickly and effectively coagulate in the polymer melt.

It is preferred for the device to comprise a feed means for a coagulant which is arranged with respect to the filter means, and preferably also with respect to the means for generating sound waves, such that it is located upstream with respect to the direction of transport of the polymer melt. By a combination of the addition of the coagulant by the feed means and the subsequent application of sound waves to the polymer melt, the coagulation of the dispersed fillers is particularly effective and quick.

In another preferred embodiment, the filter means of the device comprises one or several micro screens whose mesh size is within a range of 10 μm to 100 μm, preferably within a range of 20 μm to 50 μm, and/or one or several particle filters whose mesh sizes are within a range of 100 μm to 1,000 μm, preferably within a range of 200 μm to 500 μm. By this, the coagulated fillers can be effectively separated off without the filter means compromising the effective course of the procedure of purifying the thermoplastic polymer.

The disclosure furthermore comprises the use of a coagulant and/or of a means for generating sound waves for purifying a thermoplastic polymer, comprising at least one dispersed filler, where the use of the coagulant and/or the means for generating sound waves is characterized in that the dispersed filler is at least partially transformed to a coagulated form and subsequently filtered off.

BRIEF SUMMARY OF THE DRAWING

The disclosure and its advantages will be further explained with reference to the embodiment represented in the FIGURE, which shows a schematic sectional drawing of a device and for carrying out the method, both according to the disclosure.

According to the FIGURE, the device (1) comprises an inlet device (3) for adding thermoplastic polymer (4) and means (2) for preparing a polymer melt (6), the device (1) here being a screw-type kneading and extruding device. The device (1) furthermore comprises a transport device (5) for transporting the polymer melt (6) in the direction towards the outlet unit (8), a feed means (16) for adding coagulant (18), means (12) for generating sound waves (14) and a filter means (10). The inlet device (3), the feed means (16), the zone of the sound waves (14), the filter means (10), and the outlet unit (8) are successively arranged in or at the means (2) in the downstream direction with respect to the direction of flow of the polymer melt (6).

With the device according to the FIGURE, the method according to the disclosure can be carried out as follows:

A thermoplastic polymer (4), here PET flakes with various coloring pigments of a bottle material (concentration: 0.1% by weight), is introduced into the device (1) via an inlet device (3). The coloring pigments have mean particle diameters of about 25 nm to 0.1 μm. Across the transport means (5), the solid polymer (4) is heated to about 290° C. in the means (2) by mechanical shearing forces and thermal energy that is supplied via a heating unit (not shown), transformed to the polymer melt (6) and transported in the direction towards the outlet unit (8). Subsequently, a coagulant (18) is introduced into the polymer melt (6) flowing by via the feed means (16), initiating coagulation of the dispersed fillers in the polymer melt (6). Suited coagulants for the coagulation of coloring pigments are well-known in prior art and are not illustrated more in detail here. Then, ultrasonic waves (14) of a frequency of 45 kHz, which are introduced into the means (2) via the means (12), are applied to the polymer melt (6) together with the introduced coagulant (18). By this, the formation of coagulates of the fillers is further reinforced or accelerated, so that filler particles coagulated in the polymer melt (20) are formed which have a mean particle diameter of about 500 μm. These are subsequently filtered from the polymer melt (20) via the filter means (10), here a conventional particle filter with a pore size of 250 μm.

A purified polymer melt (9) exits from the outlet device (8) and nearly does not contain any more coloring pigments (concentration: less than 1 ppm). Upon granulation, the purified polymer material can be processed again to transparent and colorless PET bottles, optionally after further processing steps, such as an increase in intrinsic viscosity.

The above-mentioned mean particle sizes of the fillers relate to the mean value of the particle diameter of the filler or the filler coagulate in the solid polymer matrix. The mean value of the particle diameter is here determined via an optical analysis by means of a transmission electron microscope (TEM). The concentration of fillers in the PET flakes and in the purified polymer material is determined via thermoanalysis.

The invention claimed is:

1. Method of purifying a thermoplastic polymer comprising at least one dispersed filler, comprising (a) manufacturing a polymer melt of the thermoplastic polymer, and (b) filtering the polymer melt, wherein the dispersed filler is at least partially transformed to a coagulated and filterable form before step (b).

2. The method according to claim 1, and effecting the transformation of the dispersed filler to a coagulated and filterable form by adding a coagulant to one of the thermoplastic polymer, the polymer melt, and a combination thereof.

3. The method according to claim 2, wherein the coagulation of the dispersed filler is effected due to one of a chemical reaction of the filler with the coagulant, a chemical reaction of the filler which is induced by the coagulant, the change of at least one physical parameter which is induced by the coagulant, and a combination thereof.

4. The method according to claim 1 wherein the transformation of the dispersed filler to a coagulated and filterable form is effected by treating the polymer melt with sound waves.

5. The method according to claim 1, wherein the thermoplastic polymer is selected from the group consisting of polyester, polystyrene, polyolefin, polyamide, polycarbonate, and copolymers of these polymers.

6. The method according to claim 1 wherein the filler is one of an organic filler, an inorganic filler, and a combination thereof, selected from the group consisting of colorants, light stabilizers, reinforcing agents, flame retardants, catalysts for preparing the thermoplastic polymer, oxygen scavengers, and anti-blocking agents.

7. The method according to claim 1, wherein the dispersed filler is present in one of a molecular dispersed form and in the form of particles, and where the mean particle diameter is below 1 µm.

8. The method according to claim 1 wherein the coagulated and filterable filler is present in the form of particles, and where the mean particle diameter is above 5 µm.

9. The method according to claim 1, wherein the mean particle size of the filler is increased by coagulation at least by the factor 5.

10. Device for purifying a thermoplastic polymer, comprising at least one dispersed filler, comprising means for preparing a polymer melt from the thermoplastic polymer, filter means, and means for generating sound waves.

11. The device according to claim 10, wherein the means for preparing a polymer melt is a screw-type kneading and extruding device for continuously generating and transporting a polymer melt, the means for generating sound waves being arranged such that sound waves are applied to the polymer melt within the screw-type kneading and extruding device, and that the means for generating sound waves is arranged with respect to the filter means such that it is located upstream with respect to the direction of transport of the polymer melt.

12. The device according to claim 10, wherein the means for generating sound waves is an ultrasonic wave apparatus with a frequency between 16 kHz and 1.6 GHz.

13. The device according to claim 10, wherein the device is a feed means for a coagulant, which is arranged with respect to the filter means, to be located upstream with respect to the direction of transport of the polymer melt.

14. The device according to claim 10, wherein the filter means comprises one of one or a plurality of micro screens whose mesh sizes are within a range of 10 µm to 100 µm, and one of one or a plurality of particle filters whose mesh sizes are within a range of 100 µm to 1,000 µm.

15. Method of using one of a coagulant, means (12) for generating sound waves, or a combination thereof, for purifying a thermoplastic polymer, comprising at least partially transforming at least one dispersed filler by the use of one of the coagulant, the means for generating sound waves, and a combination thereof, to a coagulated form, and subsequently filtering off the at least partially transformed dispersed filler.

16. The method according to claim 3, wherein the at least one physical parameter is the pH value.

17. The method according to claim 4, wherein the sound waves are ultrasonic waves between 16 kHz and 1.6 GHz.

18. The method according to claim 17, wherein the sound waves are ultrasonic waves between 20 kHz and 100 kHz.

19. The method according to claim 7, wherein the mean particle diameter is below 0.1 µm.

20. The method according to claim 19, wherein the mean particle diameter is below 0.05 µm.

21. The method according to claim 8, wherein the mean particle diameter is above 10 µm.

22. The method according to claim 21, wherein the mean particle diameter is above 100 µm.

23. The method according to claim 9, wherein the mean particle size is increased at least by the factor of 10.

24. The method according to claim 23, wherein the mean particle size is increased at least by the factor of 100.

25. The device according to claim 10, wherein the sound waves are ultrasonic waves.

26. The device according to claim 12, wherein the frequency is between 20 kHz and 100 kHz.

27. The device according to claim 13, wherein the feed means is further arranged with respect to the means for generating sound waves to be located upstream with respect to the direction of transport of the polymer melt.

28. The device according to claim 14, wherein the mesh size for the micro screens are within a range of 20 µm to 50 µm.

29. The device according to claim 14, wherein the mesh size for the particle filters are within a range of 200 µm to 500 µm.

30. The method according to claim 5, wherein the thermoplastic polymer comprises one of polyethylene terephthalate, polypropylene, polyethylene, and copolymers thereof.

31. The method according to claim 6, wherein the colorants comprise pigments.

32. The method according to claim 31, wherein the pigments comprise titanium dioxide.

33. The method according to claim 6, wherein the reinforcing agents comprise fibers.

34. The method according to claim 33, wherein the fibers comprise one of glass fibers and polymer fibers.

* * * * *